(No Model.)
R. M. KEATING.
KNOB ATTACHMENT.
No. 325,545. Patented Sept. 1, 1885.
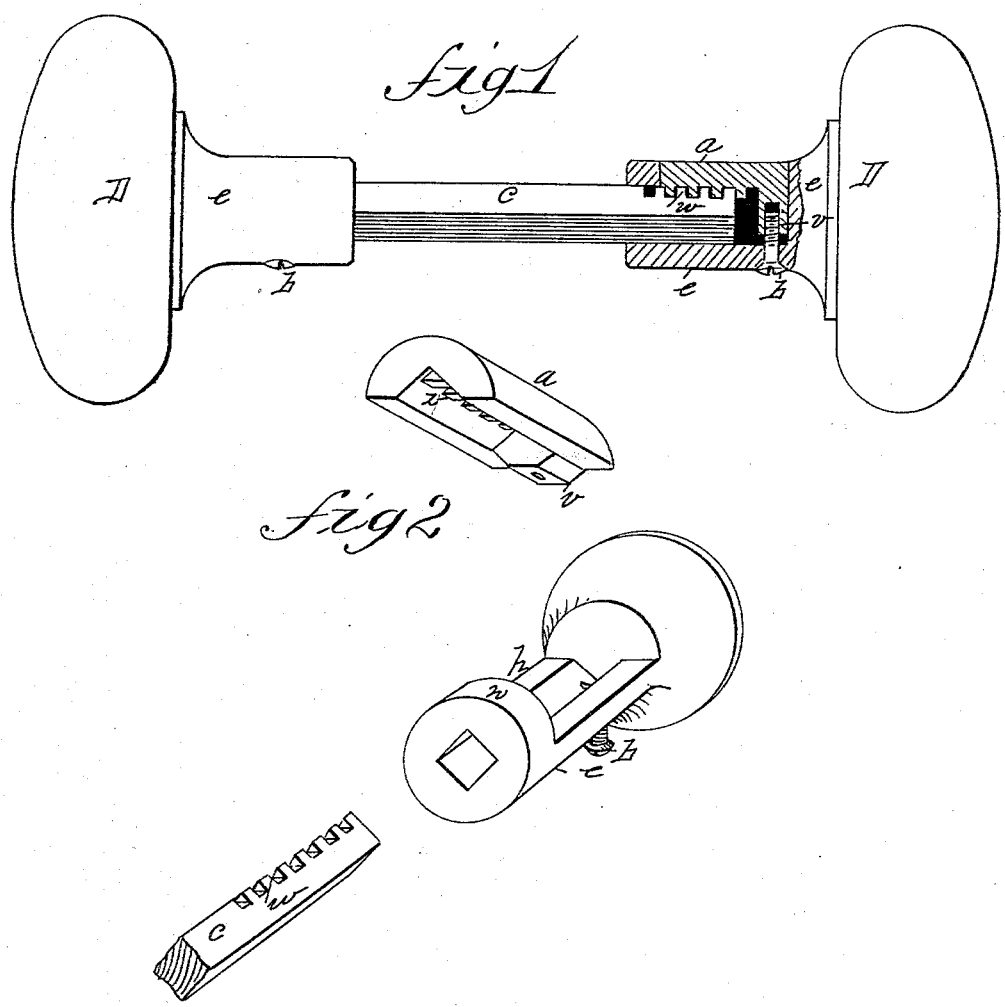
WITNESSES:
INVENTOR
Robert M Keating
BY
Henry A Chapin
ATTORNEY

UNITED STATES PATENT OFFICE.

ROBERT M. KEATING, OF SPRINGFIELD, MASSACHUSETTS.

KNOB ATTACHMENT.

SPECIFICATION forming part of Letters Patent No. 325,545, dated September 1, 1885.

Application filed December 15, 1884. (No model.)

*To all whom it may concern:*

Be it known that I, ROBERT M. KEATING, a citizen of the United States, residing at Springfield, in the county of Hampden and State of Massachusetts, have invented new and useful Improvements in Attaching Door-Knobs to Spindles, of which the following is a specification.

This invention relates to improvements in attaching door-knobs to spindles, the object being to provide improved means for such attachments, whereby the parts are more securely locked together than by devices heretofore employed, and the spindle and shank of the knob are made easily adjustable to the varying thickness of doors without employing the ordinary washers therefor.

In the drawings forming part of this specification, Figure 1 is a side elevation of two door-knobs and a spindle, showing the knob-shank in section, embodying my invention. Fig. 2 illustrates the locking-cap, the knob-shank, and a section of the spindle, all detached from each other.

In the drawings, $e$ $e$ are the knob-shanks, and D D are the door-knobs attached to said shanks in the usual way. Each of the shanks $e$ is constructed as shown in Fig. 1 in section and more particularly in Fig. 2 in perspective.

The spindle-socket end of the shank $e$ is provided with a square socket to receive the end of the square spindle $c$; but just back of the collar-like formation $n$ on the end of the shank the side of the latter is cut away, exposing a part of the interior of the spindle-socket therein, leaving an opening between the collar $n$ and the base of the shank near the knob. The remaining part of the shank constitutes about one-half of a longitudinal section thereof through its axis, and in said remaining part of the shank is located the screw $b$.

A locking-cap, $a$, made to fit into the recess $h$ in the shank $e$, has a boss, $v$, thereon, which fits into the rear end of the half of the spindle-socket in the shank, over the end of the screw $b$, and is tapped to receive the latter, and by means of the screw the cap $a$ is secured on the shank. Said cap has formed in it one-half of the spindle-socket, to match that in the shank back of collar $n$, so that when the cap is in place, as in Fig. 1, the spindle-socket is complete from the end of the shank $e$ to the side of the boss $v$ in the cap.

At base of the spindle-socket groove in the cap $a$ are formed one or more teeth, $z$, which teeth may be made narrower than shown, if desired.

The spindle $c$ is of the usual square form; but it is provided with a series of teeth, $w$, on one of its corners, on that part thereof which enters the shank $e$, which teeth conform to the shape of the spaces between the teeth $z$ in the cap $a$.

The knob D is attached to the spindle, and adjusted thereon as follows: The cap $a$ is removed from the shank by unscrewing the screw $b$, and the end of the spindle $c$ is received into the shank, its toothed corner being upward in the recess $h$. The cap $a$ is then placed in the latter, its teeth $z$ entering the spaces between the teeth $w$ of the spindle, and vice versa, and the screw $b$ being screwed into the boss $v$ the shank and knob are securely attached to the spindle.

The opening between the ends of the two shanks $e$ may be adjusted to accommodate them to the thickness of the door on which they are fitted by removing the cap $a$ and sliding the spindle one or more teeth in the shank and then replacing the cap, as before.

What I claim as my invention is—

The spindle $c$, provided with teeth or serrations $w$ thereon, the knob shank $e$, having the collar $n$ thereon, and having a portion of its side cut away, leaving about one-half of a longitudinal section thereof through its axis, and having its interior surface serrated, the cap $a$, having its interior surface serrated and provided with the tapped boss $v$, and the screw $b$ passing through the knob-shank and entering said boss, whereby the cap is secured to the shank, all combined and operating substantially as set forth.

ROBERT M. KEATING.

Witnesses:
 H. A. CHAPIN,
 J. D. GARFIELD.